United States Patent [19]  [11] 3,926,090
Bunker  [45] Dec. 16, 1975

[54] SEPARATION NUT
[75] Inventor: James W. Bunker, Saugus, Calif.
[73] Assignee: Hi-Shear Corporation, Torrance, Calif.
[22] Filed: Mar. 23, 1973
[21] Appl. No.: 344,158

[52] U.S. Cl. .................................................. 85/33
[51] Int. Cl.[2] ......................................... F16B 37/10
[58] Field of Search .......................... 85/33, DIG. 1

[56] References Cited
UNITED STATES PATENTS
3,053,131  9/1962  Stott ..................................... 85/33
3,204,515  9/1965  Dickie et al. .......................... 85/33
3,334,536  8/1967  Armstrong ............................. 85/33

Primary Examiner—Edward C. Allen
Attorney, Agent, or Firm—Donald D. Mon

[57] ABSTRACT

A separation nut for releasably engaging a threaded element. It includes a housing having an internal cavity partially bounded by a lock cylinder in which a lock piston is axially slidably fitted. The lock piston is adapted to embrace a plurality of internally threaded nut segments to hold them grouped together to surround and engage the threaded element. The lock piston is shiftable by fluid pressure to release the nut segments so that they can spread apart and in turn release the threaded element. A buffer piston is slidably fitted in a buffer cylinder carried by the lock piston. The buffer piston is engaged by the lock piston in the course of its unlocking movement so as to cause a dissipation of kinetic energy, the two pistons thereafter moving as a single body compressing fluid ahead of them to decelerate them, both events reducing the mechanical shock given surrounding objects by the separation nut in the course of its separation sequence.

4 Claims, 8 Drawing Figures

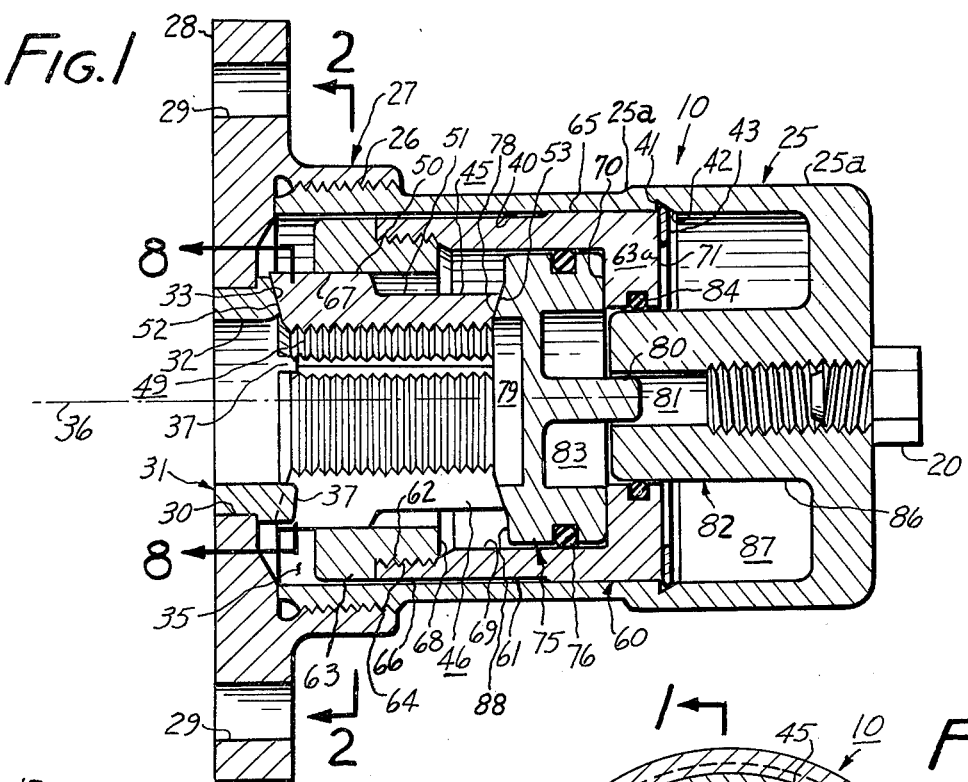
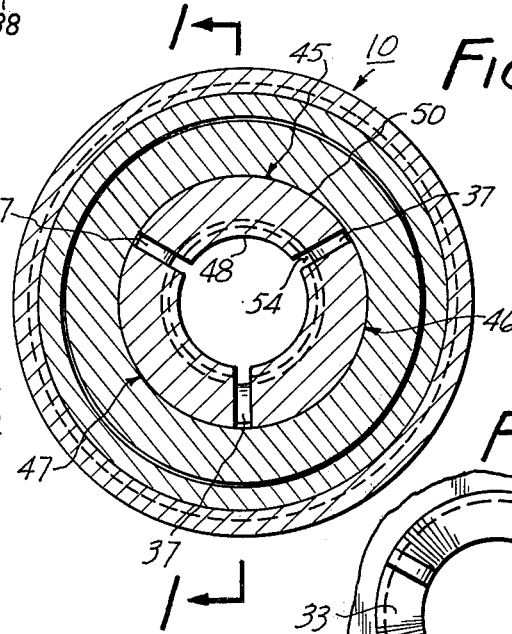
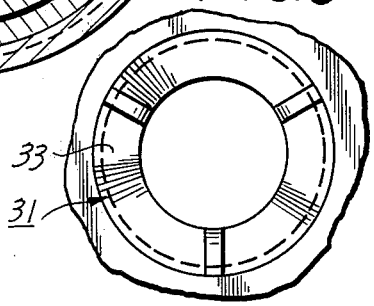
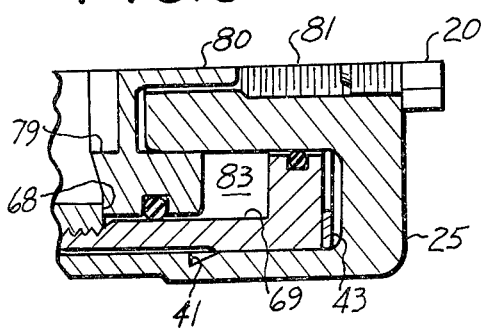
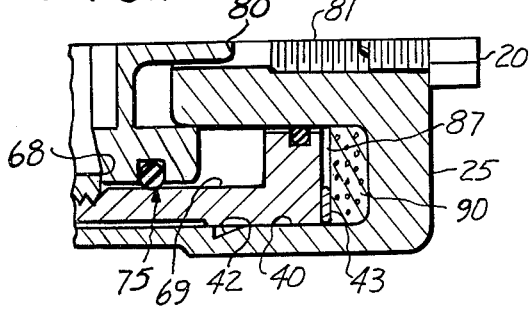

SEPARATION NUT

This application relates to a separation nut.

Separation nuts are well known. Their function is to engage and hold a threaded element until it is to be released, at which time, instead of being unthreaded, fluid pressure is exerted to move a shiftable member and release a plurality of grouped segments which had been held assembled to engage the threaded element. Some examples of prior art separation nuts are as follows:

U.S. Pat. Nos. 3,120,149, issued Feb. 4, 1964;
U.S. Pat. No. 3,170,363, issued Feb. 23, 1965;
U.S. Pat. No. 3,265,408, issued Aug. 9, 1966;
U.S. Pat. No. 3,176,573, issued Apr. 6, 1965;
U.S. Pat. No. 3,268,928, issued Aug. 30, 1966;
U.S. Pat. No. 3,261,261, issued July 19, 1966;
U.S. Pat. No. 3,331,278, issued July 18, 1967.

Reference is also made to a separation nut shown in Eric P. Selinder's presently co-pending U.S. patent application Ser. No. 270,949, filed July 12, 1972, now U.S. Pat. No. 3,813,984, which shares a common assignee with the instant application. The references cited in the prosecution of the above patents also illustrate pertinent prior art.

It is known that the transmission of mechanical shock to surrounding bodies by the separation nut, when separation occurs, is undesirable. When ordnance devices are used to provide gas under pressure for actuation, the problem is especially pronounced. Accordingly, attempts have been made to minimize this mechanical shock, and this invention constitutes another step in that direction.

A separation nut according to this invention includes a housing that has an internal cavity partially bounded by a lock cylinder. An aperture is formed through the housing to receive a threaded element to be engaged by the nut, and a gas entry port communicates with the cavity through the housing. A seat is fixed to the housing and extends around the aperture. The seat faces into the cavity and tapers inwardly as it extends thereinto. Anti-rotation means is fixed to the housing. A plurality of grouped nut segments, each of which has a concave surface that bears a fragment of the same thread, is contained in the cavity and is held against rotation by the anti-rotation means. A lock surface and relief surface are formed on each segment facing oppositely from the concave surface. A pair of abutment surfaces are formed on each of the nut segments, one at each end thereof. The segments are grouped around a central axis with one of their abutment surfaces bearing against the seat. A lock piston is slidably fitted in the lock cylinder and includes a lock surface that is so proportioned and arranged as to embrace and hold the segments in the said grouped position when it overlaps their lock surfaces. The lock piston also includes an engagement shoulder and a head. The head has a driving face and a deceleration face. A confined deceleration chamber is formed in the cavity between the housing and the deceleration face. An axially-extending buffer cylinder is formed in the lock piston and receives a buffer piston in fluid-sealing, sliding contact with it. A power chamber is formed between the buffer piston and the head of the lock piston. The gas entry port communicates with the power chamber. An abutment face on the side of the buffer piston opposite from the power chamber is so disposed and arranged so as to bear against the other of the abutment surfaces of the nut segments.

Restraint means holds the lock piston against the buffer piston and thereby holds the buffer piston against the nut segments with the lock surface of the lock piston overlapping the lock surfaces of the nut segments. The restraint means will release the lock piston for axial motion after the exertion of sufficient fluid pressure on its driving face.

According to a preferred but optional feature of the invention, a neck passes through the deceleration chamber and enters into the driving chamber between the buffer piston and the head of the lock piston, whereby to provide for additional deceleration near the end of the release movement of the lock piston by the effect of gas compression in the deceleration chamber. Another object of the invention is to provide a neck extending into the driving chamber to shorten the construction by bringing a gas generator device into the driving chamber.

According to still another preferred but optional feature of the invention, the lock piston is substantially tubular, and the lock surfaces of the nut segments are fragments of cylinders.

The above and other features of this invention will be fully understood from the following detailed description and the accompanying drawings in which:

FIG. 1 is a side view, principally in axial cross-section showing the presently preferred embodiment of the invention;

FIG. 2 is a cross-section taken at line 2—2 of FIG. 1;

FIG. 3 is a side elevation in partial cross-section of the device of FIG. 1 installed to form an assembly that is to be released;

FIGS. 4, 5 and 6 are axial cross-sections of the device of FIG. 1 in various steps in the release sequence;

FIG. 7 shows an optional feature useful in the invention; and

FIG. 8 is a fragmentary plan view of a fragment of FIG. 1.

Figure 4:
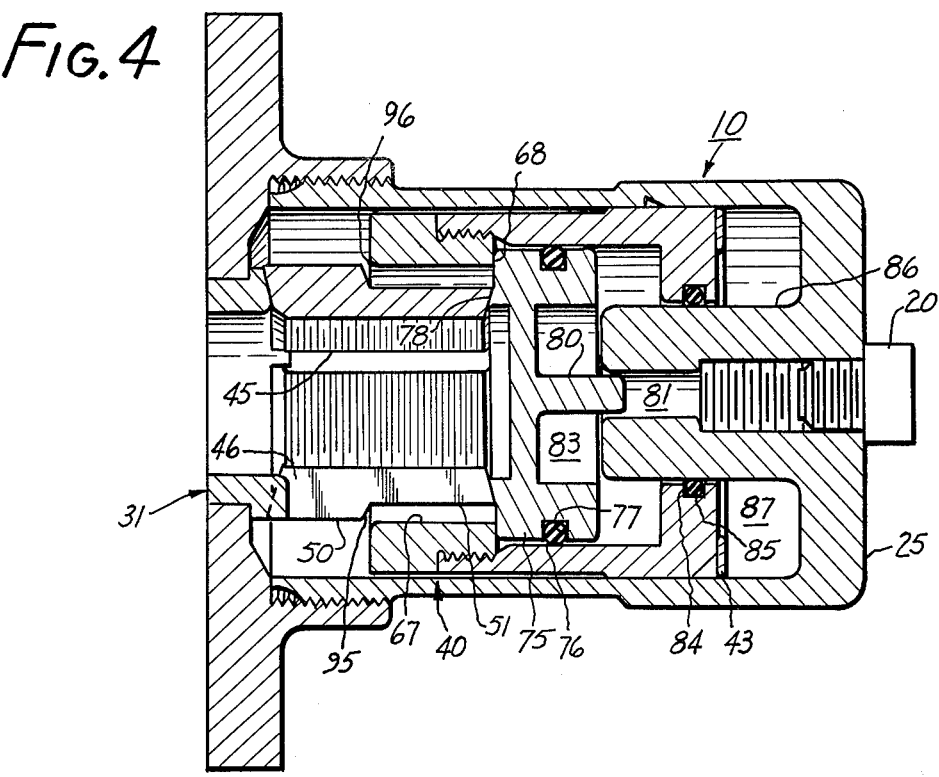

FIG. 3 illustrates a release nut 10 according to the invention engaged to a threaded element 11 such as a bolt. The element has a shank 12, a head 13 and a thread 14. It is holding a plate 15, to which the release nut is attached by fasteners 16, to another plate 17. Plates 15 and 17 are merely two generalized examples of bodies which can be joined together by use of the release nut and some associated threaded element. Release of the threaded element by actuation of the release nut will permit the two plates to be separated, because the threads of the threaded element will have been released by the release nut.

To power the separation nut, a squib 20 or other source of fluid under pressure is provided. Circuitry symbolized by leads 21, 22 will provide an electrical current to detonate the squib. A known example of a squib suitable for this application is shown in U.S. Pat. No. 3,135,200, issued to Jackson on June 2, 1964. Its detonation produces a substantial volume of hot gas under pressure. Other types of ordnance devices may be used instead of this particular squib or, instead of ordnance devices, different supplies of fluid, either gas or liquid, may be provided, accompanied by suitable valving or controls.

Nut 10 itself is shown in full detail in FIGS. 1 and 2. A housing 25 includes a case 25a having external threads 26 by means of which a base 27 is joined to the case. The base includes a flange 28 with holes 29 therethrough to pass fasteners 16.

A hole 30 is formed in the base to receive a seat member 31. The seat member has an aperture 32 to receive and pass the threaded element. As best shown in FIGS. 1 and 8, the seat comprises a tubular insert fitted into hole 30 and has a face 33, which is generally frustoconical and tapers inwardly as it extends into a cavity 35 formed inside the housing. The cavity has a central axis 36. The housing is comprised of case 25a, base 27 and seat member 31, which together bound the cavity 35.

The seat carries three keys 37 (sometimes called "anti-rotation means"). These are fixed because the seat member is non-rotatably and tightly fitted to the base. If necessary, the seat member may itself be keyed to the base, or may conveniently be made as an integral part of the base.

A lock cylinder 40 is formed as part of the inside wall of the housing and extends axially therein. It partially bounds cavity 35. A restraint groove 41 is formed in the wall of the lock cylinder. It includes a tapered wall 42 which tapers inwardly toward the right in FIG. 1, to act as a ramp. Restraint means 43, in this case comprising a split ring which can be compressed inwardly to a lesser diameter and will expand to a larger diameter, is seated in the restraint groove for a purpose yet to be described.

A plurality of nut segments 45, 46, 47 three in number (although two or any number larger than two could instead be used), are grouped around the central axis as shown to form a means for engaging the thread on the threaded element. Because all of the nut segments are externally identical, only nut segment 45 will be described in detail. The thread segments are, however, parts of the same thread, and accordingly must be used in a particular grouping to form the particular thread. In this sense only, the segments are dissimilar. None of the segments should exceed 180° in peripheral extent around the central axis, because this would prevent radial movement away from the central axis. For best results, their peripheral extent ought to be less than about 120°. Segment 45 includes a concave surface 48 which carries a fragment 49 of a thread. The fragments on all of the nut segments are part of the same thread. The three segments are preferably made by manufacturing an internally threaded tubular body, and then sawing it into the three pieces as shown.

A lock surface 50, which is a fragment of a cylinder, is formed facing oppositely away from the concave surface. A relief surface 51 is adjacent to and stepped down from the lock surface for a purpose yet to be described.

A first abutment surface 52 is adapted to engage against the face 33 of the seat member. In its preferred embodiment, surface 52 is complementarily tapered relative to face 33 so it can readily slide along it at the time of separation. A second abutment surface 53 is oppositely tapered from surface 52 and faces away from it. Spacings 54 are formed between the three segments. The spacings are so dimensioned that keys 37 are closely received in them. Accordingly, the grouped nut segments are non-rotatably restrained in the cavity.

A lock piston 60 is formed in two parts. The first part is a tubular element 61 with an internal thread 62. The other part is an internal annular sleeve 63 with an external thread 64 engaged to thread 62. A portion 66 of the outer tubular wall 65 of the lock piston is relieved to minimize sliding friction, while the remaining closer portion adjacent to the end will make a fairly close fit with the wall of lock cylinder 40. A sliding seal such as an O-ring could be interposed between these surfaces, but a certain amount of leakage between them is preferred. However, the fit should be close enough to retard leakage in order that at least some gas to the right of the lock piston will be compressed when the lock piston moves to the right. A total diametral clearance between these surfaces on the order of 0.001 inch in a lock cylinder approximately one inch in diameter is suitable. Restraint means 43 bears against the right-hand end of the lock piston in FIG. 1 in the restrained condition of FIGS. 1 and 3 for the purpose of holding the lock piston in the illustrated position. The preferred restraint means, a snap ring, will have expanded into the groove, and can be removed from it only by sufficient force exerted by the lock piston to compress the ring and force it up the tapered wall to the cylindrical surface of the lock cylinder.

The tubular sleeve of the lock piston includes an interior cylindrical lock surface 67 with a diameter that forms a sliding fit with the lock surfaces 50 when the nut segments are assembled in the group as shown. Therefore, in this position, the lock piston will hold the nut segments as an assembled group when it overlaps their lock surfaces.

The lock piston also includes an engagement shoulder 68 and an interior axially-extending buffer cylinder 69. The head 63a of the lock piston has two opposite faces, which are denoted the driving face 70 and deceleration face 71.

Sleeve 63 of the lock piston is made of steel because this material will provide strength where it is needed for a purpose to be explained. Part 61 can be made of an alluminum alloy which is sufficiently strong for its portion of the lock piston. The consequence of this two-piece construction of different materials is a lighter lock piston than would result from the usage of a single-piece lock piston constructed of the same material throughout having the necessary strength.

A buffer piston 75 makes a fluid-sealing, sliding fit with the wall of buffer cylinder 69. An O-ring 76 fitted in O-ring groove 77 makes this a fluid-tight seal. A close fit could be used and the ring omitted if some leakage would be tolerable, but the use of a sealing ring is to be preferred. The buffer piston has an abutment face surface 78 which is complementarily tapered relative to second abutment face surfaces 53 of the nut segments. Its left-hand face in FIG. 1 has a relief 79 to provide clearance for the end of the threaded element if such clearance is necessary. The buffer piston also includes a pin 80 which extends into a gas entry port 81 in a neck 82. The neck extends from the wall of the housing and is internally threaded. Squib 20 or such other fluid pressure source as is used discharges fluid into the gas entry port.

There is a substantial clearance between the pin and the wall of the gas entry port to minimize any metering effects. The pin is provided in part to give an initial larger force to the left in FIG. 1 on the buffer piston and also to reduce the volume of a power chamber 83 which is formed between the buffer piston and the head of the lock piston. The head of the pin will be impinged by gases before they have substantially expanded, and the force on the pin will therefore be greater than would be the force on the same area at its base after the gases had expanded and reached a lower pressure. Also, neck 82 enables the fluid pressure source to be threaded into port 81 so as to protrude by only a minimum distance. This enables the device to occupy a smaller envelope than if the neck were not provided.

An O-ring 84 seated in a groove 85 makes a fluid-sealing fit between the head of the lock piston and an outer cylindrical surface 86 on the neck. A deceleration chamber 87 is formed in the cavity between the housing and the head of the lock piston. It will be observed that O-ring 84 is in effect a continuation of driving face 70 of the lock piston, and that there is an open channel for fluid in power chamber 83 to reach and thereby to exert a force on the lock piston. Fluid pressure in power chamber 83 tends to move buffer piston 75 to the left, and the lock piston to the right in FIG. 1, thereby opening up a spacing between the buffer piston and driving face 70 in the event that a spacing is not already provided. The force on the O-ring in the illustration need only be enough to cause a slight movement in opposition to restraint means 43 in order for this to occur.

It will be noted in FIG. 1, and also in subsequent FIGS., that the engagement shoulder 68 on the lock piston radially overlaps shoulder 88 on the buffer piston for a purpose yet to be described.

FIG. 7 illustrates that cushioning means 90, such as an annular ring of expanded polystyrene, can be placed in the deceleration chamber where it will to be struck by the lock piston. Energy will be dissipated in the crushing of the cushioning means. Any crushable or permanently deformable material can be used for this purpose. Cushioning means may also be provided between the second abutment face surfaces 53 and the abutment face 78 of the buffer piston, should it be desired to dissipate energy at this location.

The operation of the device of FIG. 1 will now be described.

Figure 5:
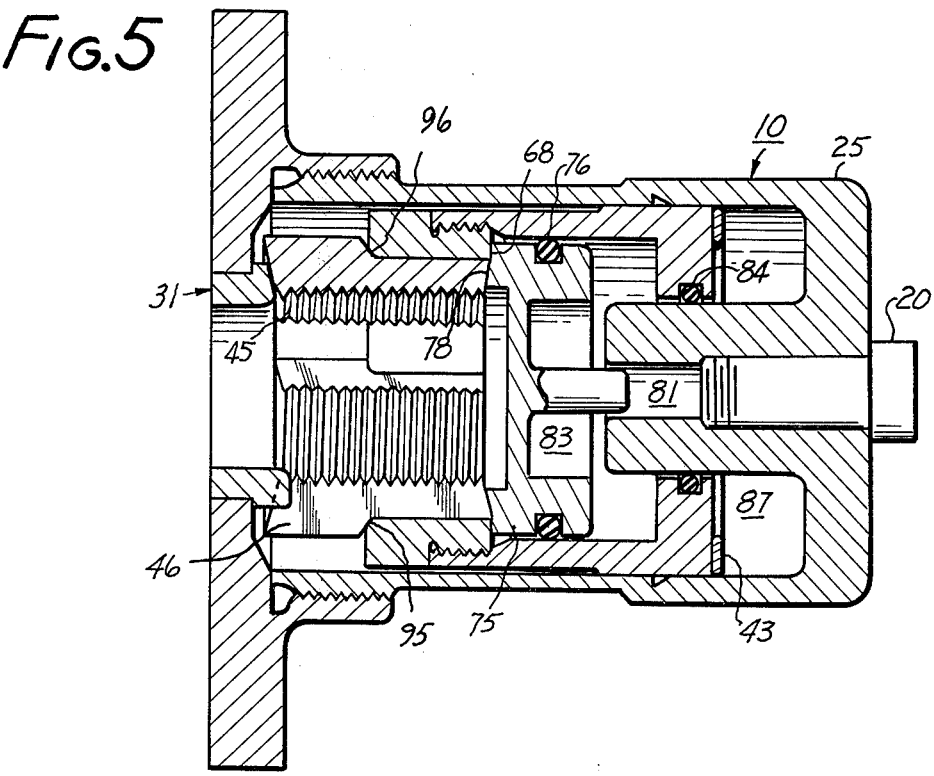

In FIGS. 1 and 3, the nut is in its assembled condition, engaging a threaded element. The lock piston is to the left in FIG. 1 and is held in that position by restraint means 43. The nut segments are held against rotation by keys 37, and are bound inwardly radially to the grouped condition by lock surface 67 which has substantially the same diameter as lock surfaces 50 in the grouped condition. The buffer piston is held against the nut segments by the head of the lock piston. The assembly remains as shown until the lock piston is moved to the right in FIG. 1 so as to move its lock surface 67 over the relief surfaces 51 so that it no longer overlaps the lock surfaces 50 of the segments. To cause this to occur, the squib is fired, or fluid pressure introduced from some other source. The resulting sequence is shown in FIGS. 4 and 5. Because the movement is so swift, it is difficult to determine the precise sequence, but the ultimate result is a combination of the two events disclosed in FIGS. 4 and 5. In FIG. 4, gases have entered into power chamber 83 which cause the buffer piston to move to the left against the segments. This exerts an outward camming force by compressing the segments between the face 33 of the seat member and the abutment face 78 of the buffer piston. Simultaneously, fluid pressure against driving face 70 of the lock piston has moved the lock piston to the position shown in FIG. 4 where lock surface 67 overlaps the relief surfaces, and the segments can move outwardly. Chamfers 95, 96 on the ends of lock surfaces 50 and 67 provide for an overlap to permit outward motion of the segments to start before the lock piston has reached the axial position shown in FIGS. 4 and 5. At the axial position of FIGS. 4 and 5, the threaded element will be free. FIG. 4 illustrates the removal of restraint on the nut segments, and FIG. 5 illustrates their full release. FIG. 5 is an idealized illustration, which may not always occur precisely as shown, but it does show a possible intermediate operating condition. The lock piston is moving at a substantial velocity with substantial kinetic energy which, if not dissipated in some manner, will be transferred to the housing and will exert a shock on the surrounding structure. It is an object of this invention at least to minimize this shock. Accordingly, when the axial position of FIGS. 4 and 5 is reached, the engagement shoulder 68 on the lock piston and shoulder 88 on the buffer piston will engage one another, and a substantial amount of kinetic energy of the lock surface will be dissipated in accelerating the buffer piston. This is the radial overlap of shoulders 68 and 88 which was referred to above. Now, because of this abutment, the buffer piston will be carried to the right in FIGS. 4 and 5 due to the law of conservation of momentum, and this combined motion will proceed until the engaged two pistons either strike surrounding structure or are brought to a stop by other resistive forces.

Such other resistive forces can be provided in two ways in this invention. In the deceleration chamber 87 there will be, at least when this device is used in the atmosphere, entrapped air. This air will be compressed by the displacement of the deceleration face of the piston into the deceleration chamber, and will exert a resistive force tending to decelerate the two pistons. Leakage past the wall of the lock piston merely reduces, but does not eliminate, this effect. This deceleration would occur even if the head of the piston were a solid disc rather than annular, and if there were no neck passing through the head. However, with the use of the illustrated construction, an additional decelerative force can be obtained from gases contained in the power chamber. It will be noted that pin 80 will reduce the open volume of the gas entry port, and movement of the buffer piston to the right in FIGS. 4 and 5 will reduce the volume of the power chamber. Because the pistons are in abutment at the respective shoulders, this will cause a compression of the gases in the power chamber which will tend to decelerate both pistons. Therefore, even should the pistons strike the surrounding structure, as shown in FIG. 6 where it is moved as far to the right as possible, much of the energy will have been either dissipated by the contact between the two pistons or by the conversion of the energy into compressed gases (or by both), so that the event is much less violent than it otherwise would have been.

In FIGS. 4, 5 and 6, the restraint means is shown as having been shoved along the lock cylinder by the lock piston. Because this is a snap ring which was radially constricted as it was moved up tapered wall 42, it will have inherently dissipated energy from the lock piston in its compression to a lesser diameter. Also, energy dissipation will occur as a consequence of frictional forces which the ring exerts on the wall of the lock cylinder as it is pushed along by the lock piston. If desired, a plurality of restraint means may be provided by forming a series of axially spaced-apart grooves, each with its own snap ring. The successive compressions of the rings would also dissipate energy.

If cushioning means had been provided as in FIG. 7, then this material will have been crushed, and will have dissipated energy in the process.

While the decelerative effect of the confined gases is useful, still devices suitable for many uses can be made which utilize only the dissipation of energy by engagement of the two pistons. Therefore, a substantially closed deceleration chamber is not necessary in all embodiments of this invention.

It may occur that not all of the energy will have been dissipated by the time the lock piston reaches the end of its release stroke, in which event there will be some rebound of the two pistons. This would occur, both as a consequence of the inelastic impact between the housing and one or both of the pistons, and as a consequence of the restoring force of the compressed gases. In such event, the two pistons will move to the left in FIGS. 4, 5 and 6, where finally they will strike the disassembled segments, and a second shock will occur. However, the number of events will have been doubled, and the violence of each will have been reduced.

There are a number of inherent advantages in the construction described herein and shown in the drawings. First, a large amount of energy is absorbed by the collision of the two pistons. Second, the overcoming of the forces to unlock the device is achieved while using high pressure at a minimum volume of the gas, and reverse acceleration as the lock piston returns from the unlocked toward the initial position is induced only by a relatively lower pressure after the gases have expanded. Furthermore, the gases have cooled during this time following their burnout from the squib, thereby reducing their pressures and attainable accelerative forces.

In designing the device, the net pressurized area on the side of the buffer piston facing into the power chamber, i.e., its total area less the area of the annular head of the lock cylinder, is made only slightly greater than that of the annular head whereby to minimize the accelerative force on the devices when rebounding from the position of FIG. 6.

The term "thread" as used herein is broadly used to connote a peripheral groove, and includes not only the conventional helical thread, but also ring grooves or the like which lie in a plane normal to the axis of the thread.

The release nut shown and described is an elegantly simple device which significantly reduces the levels of shock forces on surrounding bodies without requiring sophisticated means for accomplishing the same. This is accomplished by the use of the buffer piston for the dissipation of kinetic energy and also, when used, by the decelerative force of gases which are compressed by the pistons.

This invention is not to be limited by the embodiments shown in the drawings and described in the description, which are given by way of example and not of limitation, but only in accordance with the scope of the appended claims.

I claim:

1. A separation nut for releasably engaging a threaded element, comprising: a housing having an internal cavity, an aperture to receive an element to be engaged by the nut, and a gas entry port communicating with the cavity; a seat member fixed to the housing and extending around said aperture, said seat member facing into the cavity and tapering inwardly as it extends into the cavity; anti-rotation means fixed relative to the housing; a plurality of nut segments, each having a concave surface bearing a fragment of the same thread facing in an inward direction and engaged by the anti-rotation means, a lock surface and a relief surface, both facing in an outward direction, and a pair of abutment surfaces, one at each end of the segments, the segments being grouped around a central axis with one of their abutment surfaces bearing against the seat member; an axially-extending lock cylinder in said cavity; a lock piston slidably fitted in said lock cylinder, said lock piston including a lock surface so proportioned and arranged as to embrace and hold the segments in said grouped condition when it overlaps their lock surfaces, an engagement shoulder, and a head having a driving face and a deceleration face, and an axially-extending buffer cylinder in said lock piston; a buffer piston slidably fitted in said buffer cylinder in fluid-sealing contact therewith, a power chamber being formed in said buffer cylinder between the buffer piston and said driving face, an abutment face on the opposite side of the buffer piston from the power chamber so disposed and arranged as to bear against the other of said abutment surfaces of the nut segments; a shoulder on said buffer piston facing and radially overlapping the engagement shoulder of the lock piston, whereby said shoulders can engage one another, the gas entry port communicating with the power chamber, and restraint means for holding the lock piston against the buffer piston and thereby holding the buffer piston against the nut segments, with the lock surface of the lock piston overlapping the lock surfaces of the nut segments, the restraint means releasing the lock piston for axial motion after the exertion of sufficient fluid pressure on the lock piston, whereby upon the exertion of said sufficient fluid pressure, the lock piston is axially shifted so that its lock surface overlaps the relief surfaces of the nut segments and not their lock surfaces, the buffer piston presses against the segments to move them radially outward, and the shoulder on the lock piston engages the shoulder on the buffer piston with an accompanying dissipation of kinetic energy, a deceleration chamber being formed in the cavity between the housing and the deceleration face, displacement of the lock piston being resisted in the deceleration chamber; a neck on said housing entering the deceleration chamber and passing through the head of the lock piston; and seal means extending between said neck and the head of the lock piston, which seal means is exposed to the power chamber.

2. A separation nut according to claim 1 in which the lock piston is tubular, in which the head is an internal annulus, and in which the annular head makes a sliding, fluid-sealing fit with an external cylindrical surface on the neck.

3. A separation nut according to claim 2 in which the buffer cylinder is formed in the tubular portion of the lock piston.

4. A separation nut for releasably engaging a threaded element, comprising: a housing having an internal cavity, an aperture to receive an element to be engaged by the nut, and a gas entry port communicating with the cavity; a seat member fixed to the housing and extending around said aperture, said seat member facing into the cavity and tapering inwardly as it extends into the cavity; anti-rotation means fixed relative to the housing; a plurality of nut segments, each having a concave surface bearing a fragment of the same thread facing in an inward direction and engaged by the anti-rotation means, a lock surface and a relief surface, both facing in an outward direction, and a pair of abutment surfaces, one at each end of the segments, the segments being grouped around a central axis with one of their abutment surfaces bearing against the seat member; an axially-extending lock cylinder in said cavity; a lock piston slidably fitted in said lock cylinder, said lock piston including a lock surface so proportioned and arranged as to embrace and hold the segments in said grouped condition when it overlaps their lock surfaces, an engagement shoulder, and a head having a driving face and a deceleration face, and an axially-extending buffer cylinder in said lock piston; a buffer piston slidably fitted in said buffer cylinder in fluid-sealing contact therewith, a power chamber being formed in said buffer cylinder between the buffer piston and said driving face, an abutment face on the opposite side of the buffer piston from the power chamber so disposed and arranged as to bear against the other of said abutment surfaces of the nut segments; a shoulder on said buffer piston facing and radially overlapping the engagement shoulder of the lock piston, whereby the said shoulders can engage one another, the gas entry port communicating with the power chamber, and restraint means for holding the lock piston against the buffer piston and thereby holding the buffer piston against the nut segments, with the lock surface of the lock piston overlapping the lock surfaces of the nut segments, the restraint means comprising a peripheral groove in the wall of the lock cylinder, and a radially compressible ring adapted to expand into the said groove to hold the lock piston in a predetermined position until sufficient force is exerted on the lock piston to remove the ring from the groove, releasing the lock piston for axial motion after the exertion of sufficient fluid pressure on the lock piston, whereby upon the exertion of said sufficient fluid pressure, the lock piston is axially shifted so that its lock surface overlaps the relief surfaces of the nut segments and not their lock surfaces, the buffer piston presses against the segments to move them radially outward, and the shoulder on the lock piston engages the shoulder on the buffer piston with an accompanying dissipation of kinetic energy, a deceleration chamber being formed in the cavity between the housing and the deceleration face, displacement of the lock piston being resisted in the deceleration chamber; a neck on the housing entering through the deceleration chamber and through the head of the lock piston; and seal means extending between said neck and the head of the lock piston, which seal means is exposed to the power chamber.

* * * * *